Figure 1:
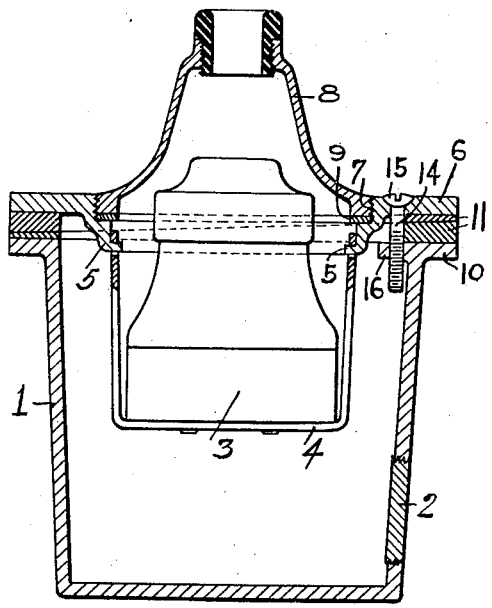

W. A. BONNELL.
OUTLET BOX.
APPLICATION FILED JAN. 30, 1917.

1,330,620.

Patented Feb. 10, 1920.
2 SHEETS—SHEET 1.

WITNESSES.
J. R. Keller

INVENTOR.
William A. Bonnell

W. A. BONNELL.
OUTLET BOX.
APPLICATION FILED JAN. 30, 1917.

1,330,620.

Patented Feb. 10, 1920.
2 SHEETS—SHEET 2.

WITNESSES.
J. R. Keller

INVENTOR.
William A. Bonnell

UNITED STATES PATENT OFFICE.

WILLIAM A. BONNELL, OF NEW YORK, N. Y.

OUTLET-BOX.

1,330,620. Specification of Letters Patent. Patented Feb. 10, 1920.

Application filed January 30, 1917. Serial No. 145,408.

*To all whom it may concern:*

Be it known that I, WILLIAM A. BONNELL, a citizen of the United States, and resident of New York city, in the county of New York and State of New York, have invented a new and useful Improvement in Outlet-Boxes; and I do hereby declare the following to be a full, clear, and exact description thereof.

My invention relates to electrical outlet boxes adapted to be embedded in the floor of a building, to receive the electric conduits carrying the conductor wires to fixtures, and to afford convenient outlet or place of attachment for the wires leading to such fixtures in room or apartment.

These boxes are usually installed while the building is in process of construction and are generally embedded in cement or other sub-structure which is below the surface of the finished floor. Owing to carelessness of instalment or to frequent passing over the unfinished floor, these box bodies are often found to be tilted at an angle to the floor surface and cannot be righted without considerable loss of time and expense.

It is, of course, necessary that the cover plate of the box shall be flush with the surface of the finished floor. To accomplish this in cases where the box bodies do not stand at right angles to such floor surface, it is necessary to provide means between the box body and cover plate that shall bring the latter to such flush position. It also often happens that the box body is embedded too deeply in the floor beneath the level of the finished surface and it is necessary, therefore, to build upon the top rim of the body to bring the cover flush with the finished surface.

A number of more or less complicated expedients have been devised to meet these conditions, but in practically all the cases, the structures employed are expensive to make and difficult to handle. Moreover, by reason of numerous joints usually found in these so-called universally adjustable boxes, it is difficult to make the box water-tight, which is a very important requirement.

My invention aims to overcome these objections and stated generally, it comprises a solid box body, usually of cast iron, together with one or more washers or rings of waterproof material, such as rubber or rubber composition, which are interposed between the rim of the box body and the cover plate to bring the latter flush with the finished floor surface. If, when the time comes to place the cover plate in position, the box body is found to be perpendicular to the finished floor surface, it may be necessary only to interpose a thin rubber or rubber composition gasket between the rim and the cover to render the box watertight. If the box body is perpendicular to the floor surface, but its top rim is found to be at a greater distance below the finished surface of the floor than the thickness of the cover plate, one or more washers or gaskets may be interposed between the rim and cover to bring the latter to the proper level. If finally the box body is found to be in a tilted or non-perpendicular position with respect to the finished floor surface, I interpose between the rim and cover a pair of rings or gaskets of rubber, or other waterproof composition, which gaskets are of what may be termed wedge-shaped or tapering thickness from one side to the other, so that by turning one on the other to the required extent, the cover receiving seat on the upper gasket may be brought to such height as to bring the upper surface of the cover plate flush with the finished floor surface. Obviously, also, if the depth of the box rim below the finished floor surface is so great that this pair of wedge-shaped gaskets will not bring the cover to the required height, one or more flat gaskets may be interposed between the lower wedge-shaped gasket and the box rim.

In conjunction with these gaskets, I employ an arrangement of fastening screws which serve, not only to screw the cover plate fast to the box body, but also assist in holding the gaskets or rings in proper position, so that they may be adjusted to raise or lower the upper surface of the cover to the required height with respect to the finished floor surface, by simply loosening the screws which connect the cover plate to the box body.

Figure 2:
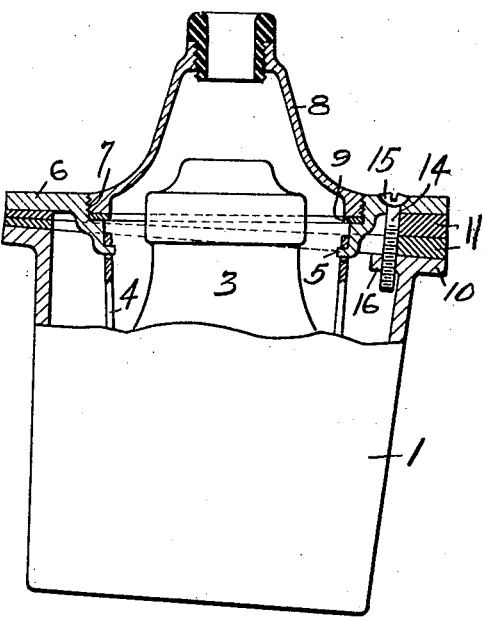
Figure 3:
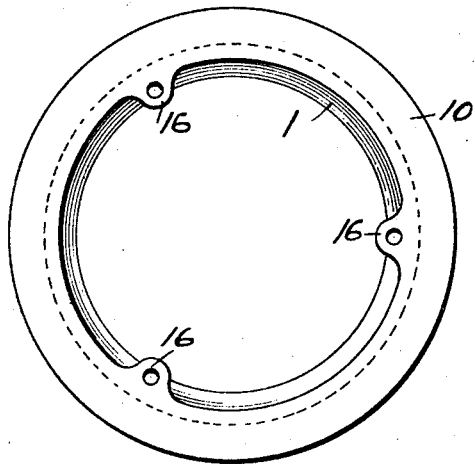
Figure 4:
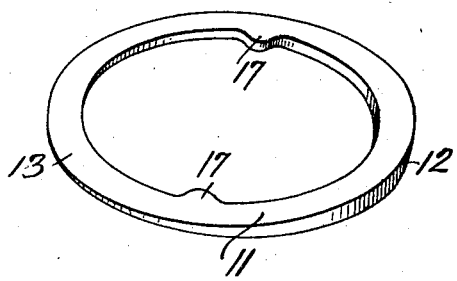
Figure 5:
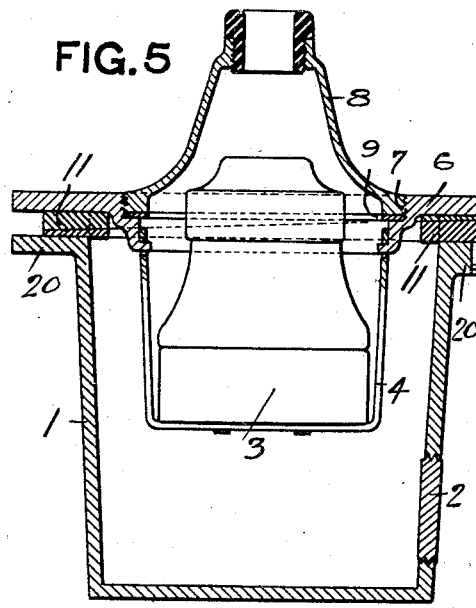
Figure 7:
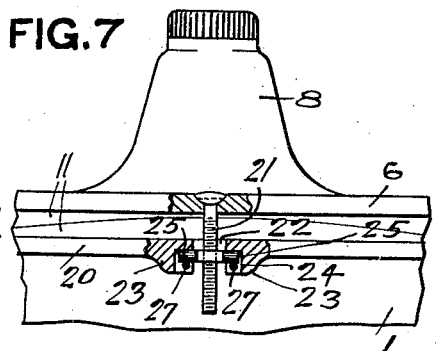
Figure 8:
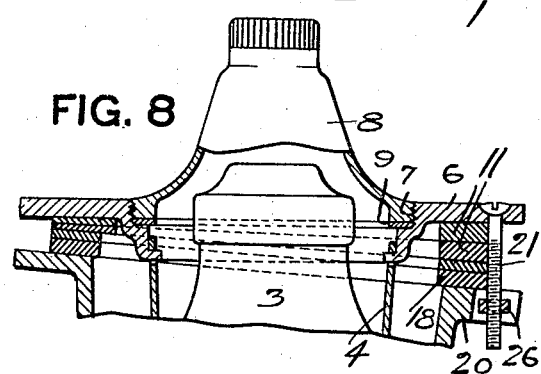
Figure 6:
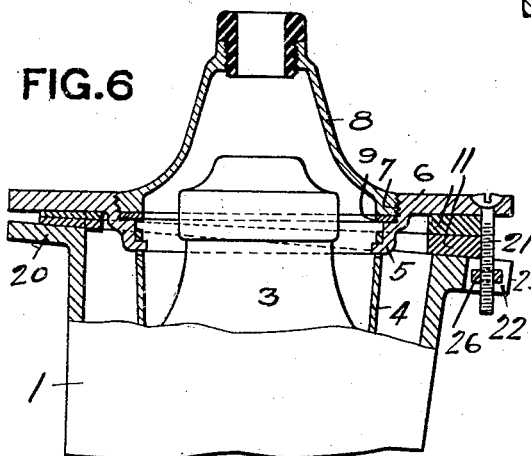
Figure 9:
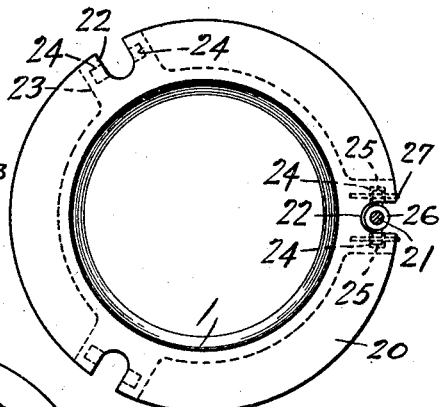
Figure 10:
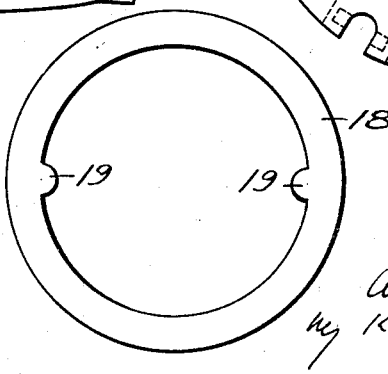

With the above objects in view, the invention consists in construction and arrangement of parts, preferred embodiment of which are illustrated in the accompanying drawings in which Figure 1 is a vertical sectional view of the box body and cover-plate showing the adjusting gaskets applied thereto. Fig. 2 is a similar view showing gaskets adjusted to compensate for the tilted position of the box body. Fig. 3 is a plan view of the box body with the cover plate and gaskets removed. Fig. 4 is a perspective view of one of the adjusting gaskets. Fig. 5 is a view similar to Fig. 1, showing a modification in the means for attaching the cover plate to the box body. Fig. 6 is a view similar to Fig. 2 of the construction shown in Fig. 5. Fig. 7 is a fragmentary detail view, partly in section, showing the manner of mounting the cover fastening screws on the box body. Fig. 8 is a fragmentary sectional view showing the use of additional flat gaskets for raising the level of the cover. Fig 9 is a plan view of the box body shown in Fig. 5 and Fig. 10 is a view of one of the adjusting gaskets showing lugs by which it may be manipulated when on the box.

Referring to the embodiment of the invention illustrated in Figs. 1 to 3, inclusive, 1 indicates the box body provided with the usual screw threaded opening 2 for the reception of the electric conduit which carries the electric conductors to a fixture such as 3, mounted within the box. The fixture here illustrated is an ordinary plug connection carried by stirrup or strap 4 which in the instance here shown is supported by lugs 5 on the cover plate 6. This cover plate is provided with a threaded opening 7 for the reception of an outlet nozzle 8. A gasket 9 is preferably interposed between the nozzle and cover plate to make the joint watertight. The box body has at its upper rim a flange 10 forming a seat for the cover plate and the gaskets interposed between the same and the body. The cover plate is preferably of the same diameter as the outer diameter of the flange 10.

To provide for adjusting the cover plate to bring the upper surface thereof flush with or parallel with the finished floor surface, in case the box body embedded in the floor stands at an angle to the finished surface thereof, as illustrated, for example, in Fig. 2, I provide a pair of wedge shaped or tapered gaskets, one of which is illustrated at 11 in perspective, Fig. 4.

The one side of this gasket is of considerable thickness, as shown at 12 and tapers gradually to the thin portion 13 at the diametrically opposite side. In practice, the greatest thickness of the gasket may be as much as a quarter of an inch, whereas the opposite side may be tapered down to a sixteenth of an inch if desired. As the gaskets of each pair are symmetrical in shape and thickness, it is obvious that when the thin portion of one is superposed upon the thick portion of the other as shown in Fig. 1, the cover plate will stand exactly at right angles with the box body. Should the embedded box body be in tilted position, however, these rings may be relatively adjusted to any extent between the limit illustrated in Fig. 1, and that illustrated in Fig. 2. In the latter position, the thicker portions of the gaskets or rings are shown to coincide and the thinner portions also coincide, so that the cover plate may be thus brought to a horizontal position flush with the finished floor surface, although the box body may not be perpendicular to such surface.

In practice, a limit of adjustment of substantially half an inch, such as here illustrated, is usually found to be ample to compensate for any irregularity found in the alinement of the top or rim of the box body with the floor surface, although it is obvious that if a greater extent of adjustment is required, gaskets or rings of greater difference in thickness at opposite sides may be employed.

In order to screw the cover plate to the box body and upon the gaskets, I employ screws 14, preferably having elliptic heads 15, which will automatically adjust themselves according to the angle at which the cover stands to the box body. In the form of the invention shown in Figs. 1, 2 and 3, these screws are secured in threaded lugs 16 extending within the rim of the box body. The adjusting rings or gaskets 11 are made of such width that their outer edges lie flush with the outer edges of the flange 10 and the cover plate 6 and the inner faces of these rings rest against the fastening screws 14. Thus, it will be seen that when the cover plate and screws are in position, these rings are held in proper alinement and against lateral displacement.

In placing the cover plate in position on the box and to bring it flush with the finished floor surface, adjusting gaskets are placed upon the box rim and may be relatively adjusted approximately to the right position to bring the cover plate into alinement with the finished floor surface. The cover plate is then placed in position over the gaskets and the screws 14 inserted. By means of lugs 17, projecting inwardly from the gaskets, as shown in Fig. 4, said gaskets may then be adjusted by reaching through the nozzle receiving opening 7 in the cover plate until the cover plate ring is brought to proper position. It will be noted that the screws 14 will hold these gaskets in perfect alinement and against lateral displacement while said gaskets are being so adjusted, and when the proper adjustment is reached, the screws 14 may be tightened up.

It will be seen also that the holding in position of the gaskets by the screws, will maintain the perimeters of the gaskets in proper alinement with the perimeters of the box flange 10 and cover plate 6 respectively, thus giving a neat finish to the construction.

In the case the box is so deeply embedded in the floor that the thickness of the adjusting gaskets is not sufficient to raise the cover plate up into alinement with the floor, one or more flat gaskets 18 such as illustrated in Fig. 8 may be added. These gaskets also may be provided with adjusting lugs 19.

By my improved construction, therefore, means are provided for adjusting the box cover axially on the box and at an angle to the box body, thus providing for what is commonly designated universal adjustment of the cover on the box.

Furthermore, since the box body is one solid casting, and both the adjusting gaskets 11 and the building up gaskets 18 are of waterproof material, the single joint between the cover and the box body is made watertight by the adjusting elements themselves. Great economy is secured by this construction, since the box body and cover plate of ordinary or standard construction and the adjusting gaskets may be very cheaply produced.

In the embodiment of the invention illustrated in Figs. 5 to 9, inclusive, the box 1 and cover plate 6 and adjusting gaskets 11 may be of the same construction as heretofore described, but the flange 20 of this box is made of somewhat greater width and the diameter of the cover 6 may be greater to provide for positioning of the fastening screws 21 outside of the gaskets.

In this embodiment also, I provide a different construction of screw receiving part on the box body to maintain the heads of the screws flush with the surface of the cover, notwithstanding the tilted or angular position of the box body with respect to said cover. To this end, the flange 20 of the box is notched or recessed as at 22, and depending lugs 23 extend down each side of notches 22. These lugs are recessed as at 24 to receive the trunnions 25 of a rocking nut 26 in which the screw is fastened. To retain these rocking nuts in position, I may insert short pins 27 into suitable apertures in the box flange, below the rocking nut trunnions 25. It is obvious that no heavy strain comes upon the pins 27 since the pull upon the rock nut is entirely against the under side of the recess 24.

The manner of installing and the operation of this box is substantially the same as heretofore described for the first embodiment.

While I have herein described particular embodiments of the invention, it is to be understood that the same may be altered in details and relative arrangements of parts within the scope of the appended claims.

What I claim is:

1. An outlet box comprising a box body and a cover therefor, one or more gaskets interposed between said box and cover, said gaskets being capable of relative adjustment to tilt the cover with respect to the box body, and a plurality of screws for securing the box and cover together, said screws having a rocking engagement with the box and cover to accommodate the tilted position of the cover.

2. An outlet box comprising a box body, a cover therefor, one or more gaskets interposed between said box and cover, said gaskets being capable of relative adjustment to tilt the cover with respect to the box body, a plurality of screws, and nuts mounted for rocking movement and coöperating with said screws to secure the box and cover together.

3. An outlet box comprising a box body having a peripheral flange provided with spaced recesses, nuts supported for rocking movement in the said recesses, a flanged cover for the said box body, and screws extending through the said cover and coöperating with the said rocking nuts to secure the said box and cover together.

In testimony whereof, I the said WILLIAM A. BONNELL, have hereunto set my hand.

WILLIAM A. BONNELL.

Witnesses:
JOHN F. WILL,
J. R. KELLER.